US010336192B2

(12) United States Patent
Fujita

(10) Patent No.: US 10,336,192 B2
(45) Date of Patent: Jul. 2, 2019

(54) PROJECTION TYPE DISPLAY DEVICE AND OPERATION ASSISTANCE METHOD

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/638,344

(22) Filed: Jun. 29, 2017

(65) Prior Publication Data

US 2017/0355265 A1     Dec. 14, 2017

Related U.S. Application Data

(63) Continuation of application No. PCT/JP2016/052934, filed on Feb. 1, 2016.

(30) Foreign Application Priority Data

Mar. 12, 2015   (JP) .................................. 2015-049626

(51) Int. Cl.
*B60K 37/02*   (2006.01)
*B60Q 9/00*    (2006.01)
(Continued)

(52) U.S. Cl.
CPC .............. *B60K 37/02* (2013.01); *B60K 35/00* (2013.01); *B60Q 9/008* (2013.01);
(Continued)

(58) Field of Classification Search
CPC .... H04N 9/3194; H04N 9/3155; B60K 37/00; B60K 37/02; B60K 37/04; B60K 37/06;
(Continued)

(56) References Cited

U.S. PATENT DOCUMENTS 6,937,377 B1 * 8/2005 Brown ............... G02B 27/0994
                                                      348/E9.027
7,772,995 B2   8/2010 Cabaret De Alberti et al.
(Continued)

FOREIGN PATENT DOCUMENTS

JP    2001-315547    11/2001
JP    2004-249836     9/2004
(Continued)

OTHER PUBLICATIONS

"International Search Report (Form PCT/ISA/210) of PCT/JP2016/052934", dated Mar. 22, 2016, with English translation thereof, pp. 1-4.

(Continued)

*Primary Examiner* — Dong Hui Liang
(74) *Attorney, Agent, or Firm* — JCIPRNET

(57) ABSTRACT

Provided are a projection type display device and an operation assistance method that enable an operator to enjoy an operation assistance function even in the case of occurrence of abnormality in an optical modulation unit or an image information input unit during operation of a vehicle. A system control unit 47 of a HUD, if sensing abnormality in an optical modulation device 44 and a drive unit 45, stops a light source unit 40 and, furthermore, in the case of image information generated by a projected image information generation unit 52 including image information that calls attention of the operator to the front field of view, displays an alert image based on the image information on a liquid crystal display device 61 in a meter cluster.

12 Claims, 8 Drawing Sheets

(51) Int. Cl.
*G09G 3/00* (2006.01)
*G02B 27/01* (2006.01)
*B60W 50/029* (2012.01)
*B60W 50/14* (2012.01)
*B60K 35/00* (2006.01)
*G09G 5/00* (2006.01)

(52) U.S. Cl.
CPC .......... *B60W 50/029* (2013.01); *B60W 50/14* (2013.01); *G02B 27/0101* (2013.01); *G09G 3/002* (2013.01); *G09G 5/00* (2013.01); *B60K 2350/1056* (2013.01); *B60K 2350/1076* (2013.01); *B60K 2350/2052* (2013.01); *B60K 2350/352* (2013.01); *B60K 2350/96* (2013.01); *G02B 2027/014* (2013.01); *G02B 2027/0138* (2013.01); *G02B 2027/0141* (2013.01); *G09G 2320/10* (2013.01); *G09G 2354/00* (2013.01); *G09G 2380/10* (2013.01)

(58) Field of Classification Search
CPC ............... B60K 35/00; G02B 27/1026; G02B 27/1033; G02B 27/1046; G02B 27/1053
See application file for complete search history.

(56) References Cited

U.S. PATENT DOCUMENTS

| | | | |
|---|---|---|---|
| 2001/0040534 A1 | 11/2001 | Ohkawara et al. | |
| 2002/0085043 A1* | 7/2002 | Ribak | B60K 35/00 715/810 |
| 2010/0207843 A1* | 8/2010 | Coloma | G02B 27/01 345/1.1 |
| 2011/0025584 A1* | 2/2011 | Nishigasako | G02B 27/01 345/76 |
| 2012/0224060 A1* | 9/2012 | Gurevich | B60R 1/00 348/148 |
| 2012/0268262 A1* | 10/2012 | Popovic | B60Q 9/008 340/438 |
| 2014/0180536 A1* | 6/2014 | Nagata | B60K 35/00 701/36 |
| 2015/0022898 A1* | 1/2015 | Yamakawa | B60K 35/00 359/633 |
| 2015/0098029 A1* | 4/2015 | Sato | G09G 3/3406 349/11 |
| 2015/0331494 A1 | 11/2015 | Mizuno | |

FOREIGN PATENT DOCUMENTS

| | | |
|---|---|---|
| JP | 2005-297810 | 10/2005 |
| JP | 2005-343343 | 12/2005 |
| JP | 2010-064633 | 3/2010 |
| JP | 2010064633 A * | 3/2010 |
| JP | 2013-137355 | 7/2013 |
| JP | 2014-125006 | 7/2014 |
| JP | 2014-144693 | 8/2014 |
| JP | 2014-234088 | 12/2014 |

OTHER PUBLICATIONS

"International Preliminary Report on Patentability (Form PCT/IPEA/409) of of PCT/JP2016/052934" dated Nov. 4, 2016, with English translation thereof, pp. 1-12.

"Office Action of China Counterpart Application," with machine English translation thereof, dated Feb. 6, 2018, p. 1-p. 12.

* cited by examiner

PROJECTION TYPE DISPLAY DEVICE AND OPERATION ASSISTANCE METHOD

CROSS-REFERENCE TO RELATED APPLICATIONS

This application is a Continuation of PCT International Application No. PCT/JP2016/052934, filed on Feb. 1, 2016 which claims priority under 35 U.S.C. § 119(a) to Japanese Patent Application No. 2015-049626, filed on Mar. 12, 2015. Each of the above application(s) is hereby expressly incorporated by reference, in its entirety, into the present application.

BACKGROUND OF THE INVENTION

1. Field of the Invention

The present invention relates to a projection type display device and an operation assistance method using the projection type display device.

2. Description of the Related Art

Known is a vehicle head-up display (HUD) device that uses, as a screen, a combiner arranged on a windshield or near the front of a windshield of a vehicle such as an automobile, a streetcar, a heavy machine, an aircraft, and a watercraft operated by a human being and projects projection light to the screen to display an image (refer to JP2014-234088A, JP2014-144693A, JP2013-137355A, JP2010-064633A, JP2005-343343A, and JP2005-297810A).

According to this HUD, a user can visually recognize the image, which is displayed on the windshield or the like by the projection light projected from the HUD, in an overlaid manner on a front scene on the windshield side.

JP2014-234088A discloses a HUD that, in the case of an occurrence of abnormality such as interposition or mechanical interference in the combiner, senses and reports the abnormality to a crew.

JP2014-144693A discloses a technology that, when an operator operates an electronic device such as a car navigation or an audio device with a finger during operation, detects the motion of the finger with a sensor and displays, on a meter display unit in an instrument panel, information displayed thus far on a HUD, thereby preventing erroneous operation of the electronic device by the operator.

JP2013-137355A discloses a HUD that includes two projection units displaying the same alert image in an overlaid manner and, in the case of a failure of one projection unit, complements display with the other normally operating projection unit.

JP2010-064633A discloses a HUD that, in the case of detection of abnormality in a signal that drives a pixel of a display device, turns off a light source of the display device, thereby not allowing an operator to visually recognize an erroneous display image.

JP2005-343343A discloses a vehicle display device that includes a HUD having a self-diagnostic function and a separate liquid crystal display unit from the HUD and, when the HUD is unavailable, displays the unavailability on the liquid crystal display unit.

JP2005-297810A discloses a vehicle display system that includes a plurality of information display means including a HUD and displays information on the optimal information display means according to the type, the importance, and the like of the information.

SUMMARY OF THE INVENTION

Generally, a HUD includes a light source unit, an optical modulation unit that spatially modulates light emitted from the light source unit in accordance with image information, an image information input unit that transfers image information to the optical modulation unit, and a projection unit that projects light spatially modulated by the optical modulation unit to a combiner.

A vehicle HUD representatively for an automobile is considered to not only display the traveling speed of a vehicle and guide information for navigation to a destination but also may additionally have an operation assistance function that senses existence of an obstacle or a dangerous object such as a pedestrian, a power pole, a street tree, or a vehicle accident and calls attention of the operator.

If abnormality occurs in the optical modulation unit or the image information input unit in the device of the HUD, an erroneous image may be displayed on the combiner, or an excessive intensity of light may be projected to the combiner and hinder the front field of view depending on the situation.

Therefore, in the case of occurrence of such abnormality, for example, it is required to not display the erroneous image that may be displayed on the combiner or to remove the excessive intensity of light that may be projected to the combiner for recovery of the front field of view, by placing a power source of the HUD into an OFF state.

In the case of the HUD that includes the operation assistance function, the front field of view is hindered if abnormal image light is projected to the combiner due to abnormality in the optical modulation unit or the image information input unit. The operator cannot visually recognize existence of an obstacle or a dangerous object during a period from projection of abnormal image light to the combiner until recovery of the front field of view after the image light is removed.

Even after recovery of the front field of view after abnormal image light projected to the combiner is removed, images are not displayed on the combiner if the power source of the HUD is in the OFF state. Thus, the operator cannot enjoy the operation assistance function of the HUD and has to visually recognize existence of an obstacle or a dangerous object with eyes.

JP2014-234088A and JP2005-343343A disclose a technology that reports occurrence of abnormality in the HUD to the operator. However, this technology only enables the operator to recognize occurrence of abnormality, and the operator cannot enjoy the operation assistance function of the HUD.

JP2010-064633A discloses a technology that prevents erroneous display by placing the light source into the OFF state when abnormality occurs in the HUD. However, this technology may cause the front field of view to be hindered during a short period from occurrence of abnormality until the light source being placed into the OFF state. Even after recovery of the front field of view, images are not displayed on the combiner. Thus, the operator cannot enjoy the operation assistance function of the HUD.

JP2014-144693A and JP2005-297810A disclose a technology that enables an image displayed on the combiner of the HUD to be displayed on a separate image display device. However, JP2014-144693A and JP2005-297810A do not consider operation of the HUD at the time of a failure.

The HUD disclosed in JP2013-137355A maintains display with the other HUD when one of two HUDs fails. However, it is not clear whether or not a region where the HUD displays an image assumes a windshield, and the above problem is not recognized. In addition, alert images displayed by the HUD are an image indicating turning on of a headlight, an image indicating a hydraulic alert, and an image indicating a brake alert, any of which is an image for alerting abnormality in a vehicle. Therefore, the problem that the operation assistance function of the HUD cannot be enjoyed does not occur.

While the problems are mentioned with respect to the vehicle HUD for an automobile or the like, those problems may occur in all vehicles operated by a human being including an automobile, a streetcar, a heavy machine, an aircraft, a watercraft, and the like.

The present invention is conceived in view of the above matter, and an object thereof is to provide a projection type display device and an operation assistance method that enable an operator to enjoy an operation assistance function even in the case of occurrence of abnormality in at least one of an optical modulation unit or an image information input unit during operation of a vehicle.

A projection type display device of the present invention comprises an image information generation unit that generates image information, an optical modulation unit that spatially modulates light emitted from a light source unit in accordance with the image information, an image information input unit that inputs the image information into the optical modulation unit, a projection unit that projects the light spatially modulated by the optical modulation unit to a projection surface disposed on a windshield of a vehicle, an abnormality sensing unit that senses abnormality in at least one of the optical modulation unit or the image information input unit, and a control unit that, in a case of the abnormality sensing unit sensing abnormality in at least one of the optical modulation unit or the image information input unit, stops at least one of the optical modulation unit or the light source unit and, furthermore, in a case of the image information generated by the image information generation unit including image information which calls attention of an operator of the vehicle to the field of view in a traveling direction of the vehicle, produces an output for calling attention of the operator to the field of view.

An operation assistance method of the present invention is an operation assistance method that uses a projection type display device mounted in a vehicle, the projection type display device including an image information generation unit that generates image information, an optical modulation unit that spatially modulates light emitted from a light source unit in accordance with the image information, an image information input unit that inputs the image information into the optical modulation unit, and a projection unit that projects the light spatially modulated by the optical modulation unit to a projection surface disposed on a windshield of the vehicle, and the method comprising an abnormality sensing step of sensing abnormality in at least one of the optical modulation unit or the image information input unit, and a control step of, in a case of sensing abnormality in at least one of the optical modulation unit or the image information input unit in the abnormality sensing step, stopping at least one of the optical modulation unit or the light source unit and, furthermore, in a case of the image information generated by the image information generation unit including image information which calls attention of an operator of the vehicle to the field of view in a traveling direction of the vehicle, producing an output for calling attention of the operator to the field of view.

According to the present invention, it is possible to provide a projection type display device and an operation assistance method that enable an operator to enjoy an operation assistance function even in the case of occurrence of abnormality in at least one of an optical modulation unit or an image information input unit during operation of a vehicle.

DESCRIPTION OF THE PREFERRED EMBODIMENTS

Hereinafter, an embodiment of the present invention will be described with reference to the drawings.

Figure 1:
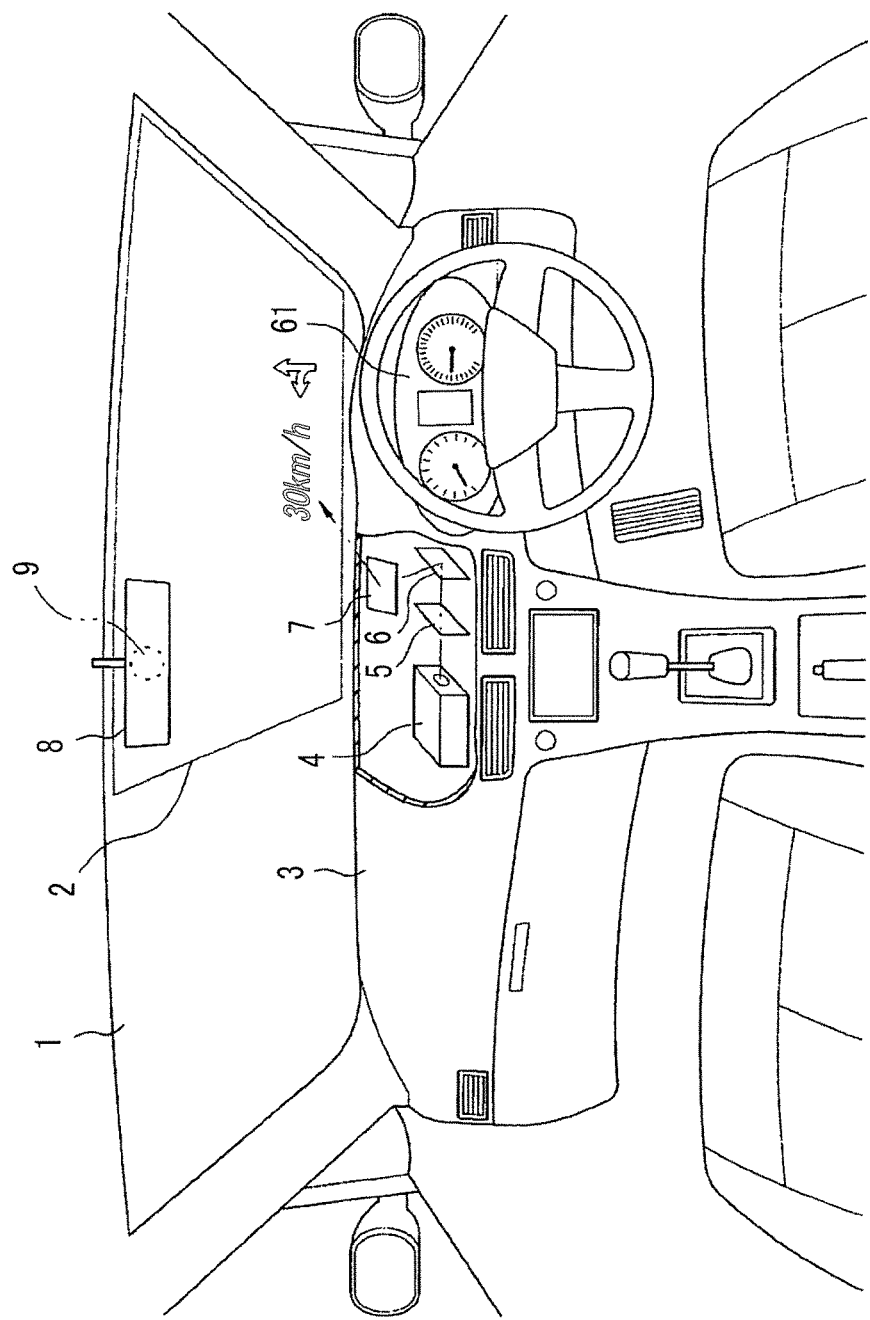
FIG. 1 is a diagram illustrating a schematic configuration of a HUD that is one embodiment of a projection type display device of the present invention.

FIG. 1 is a diagram illustrating a schematic configuration of a HUD that is one embodiment of a projection type display device of the present invention. While the HUD is used as being mounted in an automobile, the HUD can also be mounted in a vehicle other than an automobile, such as a streetcar, a heavy machine, or a watercraft.

The HUD illustrated in FIG. 1 includes a combiner 2 that is bonded to the inner surface or the outer surface of a windshield 1 of the automobile; a light source section 4 that is incorporated in a dashboard 3; a diffusion plate 5, a reflective mirror 6, and a magnifier 7 that are also incorporated in the dashboard 3; and an imaging unit 9 that is attached to the inner side of a rearview mirror 8 above the windshield 1.

The diffusion plate 5 changes light emitted from the light source section 4 into plane light by diffusing the light. The reflective mirror 6 reflects, to the magnifier 7 side, the light that is changed into plane light by the diffusion plate 5. The magnifier 7 enlarges the reflective light and projects the reflective light to the combiner 2.

The combiner 2 constitutes a projection surface to which the light projected from the magnifier 7 is projected. An operator of the automobile can visually recognize information such as a picture or a character related to operation by seeing image light that is projected to the combiner 2 and reflected. The combiner 2 has a function of transmitting light from the outside of the windshield 1 (outer world). Thus, the operator can visually recognize an image in which the image based on the light projected from the magnifier 7 is overlaid on a scene of the outer world.

The imaging unit 9 attached to the rearview mirror 8 images a scene at the front (in the traveling direction of the automobile) of the windshield 1 and is connected to the light source section 4 in a wired or wireless manner. Captured image information of the scene in the traveling direction of the automobile acquired in the imaging unit 9 is transferred to the light source section 4 in a wired or wireless manner.

The imaging unit 9 may be dedicated to the HUD or may be an imaging unit that is mounted in the automobile for other purposes such as a collision prevention system. The imaging unit 9 may be attached to a place other than the rearview mirror 8 such as the dashboard 3 or near a headlight of the automobile.

The imaging range of the imaging unit 9 is set to include all outer world images that are seen through the combiner 2 from the operator. The captured image information that is acquired by imaging by the imaging unit 9 includes parts corresponding to the outer world images. That is, at least a part of the captured image information corresponds to the range in which the combiner 2 is disposed.

A liquid crystal display device 61 that is a different display device from the HUD is disposed in a meter cluster region of the dashboard 3 (a part at the front of an operating handle) at the front of an operating seat. The liquid crystal display device 61 is connected to the HUD in a wired or wireless manner and displays not only images of various instruments such as a speedometer, a tachometer, a fuel gauge, and a water temperature gauge arranged in a general meter cluster panel but also an image that corresponds to the image projected to the combiner 2 of the HUD. The liquid crystal display device 61 may use not only a liquid crystal display device but also a display device by an organic electroluminescent device.

Figure 2:
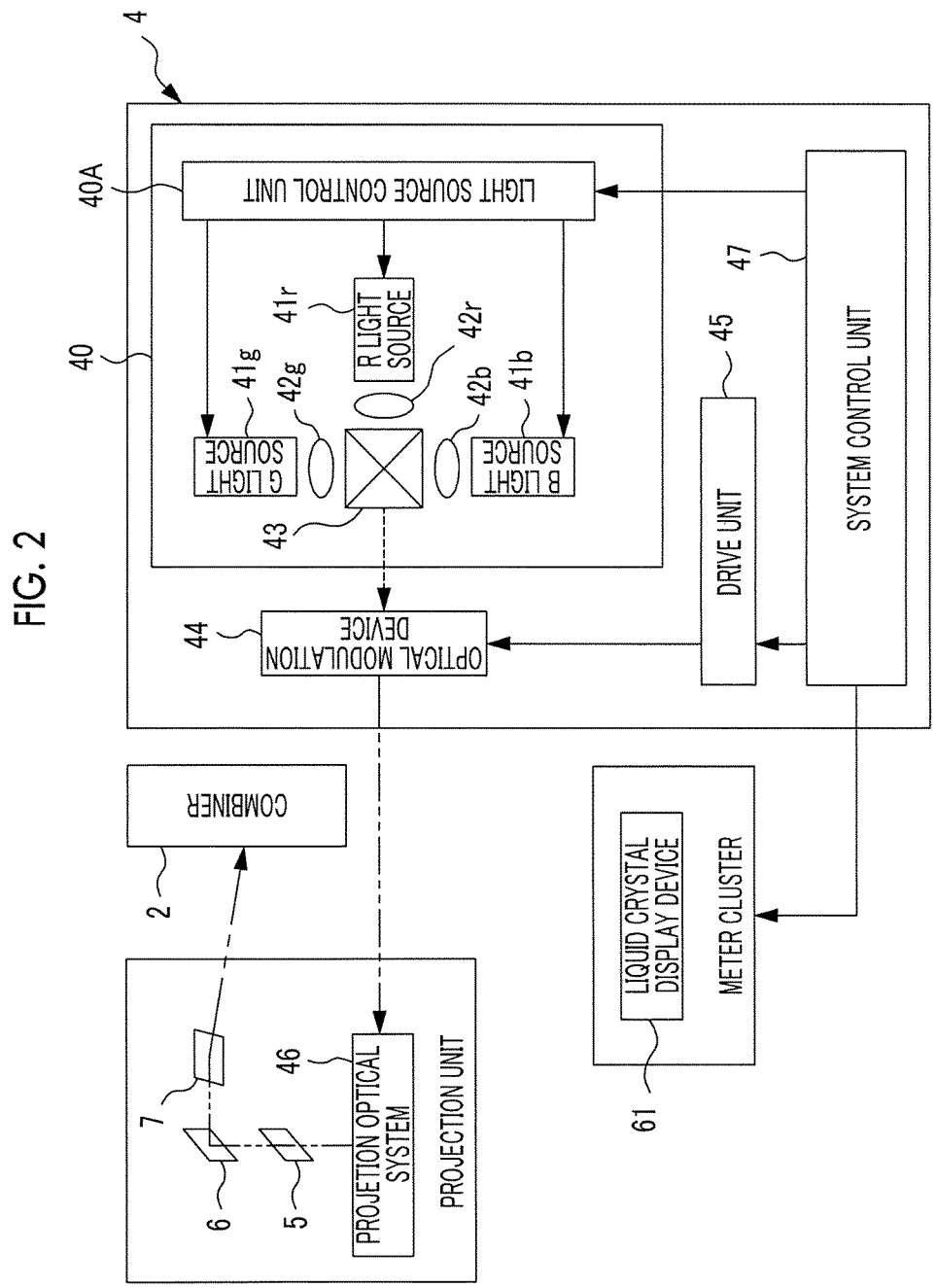
FIG. 2 is a schematic diagram illustrating a detailed configuration example of the HUD illustrated in FIG. 1.

FIG. 2 is a schematic diagram illustrating a detailed configuration example of the HUD illustrated in FIG. 1.

The light source section 4 of the HUD includes a light source unit 40, an optical modulation device 44, a drive unit 45 that drives the optical modulation device 44, and a system control unit 47 that controls the entirety of the HUD.

The light source unit 40 includes a light source control unit 40A, a R light source 41r that is a red light source emitting red light, a G light source 41g that is a green light source emitting green light, a B light source 41b that is a blue light source emitting blue light, a dichroic prism 43, a collimator lens 42r that is disposed between the R light source 41r and the dichroic prism 43, a collimator lens 42g that is disposed between the G light source 41g and the dichroic prism 43, and a collimator lens 42b that is disposed between the B light source 41b and the dichroic prism 43.

The dichroic prism 43 is an optical member for guiding light emitted from each of the R light source 41r, the G light source 41g, and the B light source 41b onto the same optical path. That is, the dichroic prism 43 transmits and emits red light collimated by the collimator lens 42r to the optical modulation device 44. In addition, the dichroic prism 43 reflects and emits green light collimated by the collimator lens 42g to the optical modulation device 44. Furthermore, the dichroic prism 43 reflects and emits blue light collimated by the collimator lens 42b to the optical modulation device. The optical member that has such a function is not limited to a dichroic prism. For example, a cross dichroic mirror may be used.

The R light source 41r, the G light source 41g, and the B light source 41b of the light source unit 40 use light emitting devices such as a laser and a light emitting diode (LED). While the present embodiment illustrates the HUD that includes three light sources of the R light source 41r, the G light source 41g, and the B light source 41b as a light source of the light source unit 40, the number of light sources may be two or greater than or equal to four.

The light source control unit 40A sets predetermined emitted light intensity patterns for the intensities of emitted light of each of the R light source 41r, the G light source 41g, and the B light source 41b and controls the R light source 41r, the G light source 41g, and the B light source 41b to emit light in order in accordance with the emitted light intensity patterns.

The optical modulation device 44 spatially modulates light emitted from the dichroic prism 43 and emits, to a projection optical system 46, light that corresponds to projected image information (red image light, blue image light, and green image light) which is image information.

For example, a liquid crystal on silicon (LCOS), a digital micromirror device (DMD), a micro electro mechanical systems (MEMS) device, and a liquid crystal display device can be used as the optical modulation device 44.

The drive unit 45 drives the optical modulation device 44 in accordance with the projected image information input from the system control unit 47 and causes light corresponding to the projected image information (red image light, blue image light, and green image light) to be emitted to the projection optical system 46. The optical modulation device 44 and the drive unit 45 constitute an optical modulation unit that spatially modulates light emitted from the light source unit 40 in accordance with the projected image information.

The projection optical system 46 is an optical system for projecting light emitted from the optical modulation device 44 to the diffusion plate 5. The projection optical system 46, the diffusion plate 5, the reflective mirror 6, and the magnifier 7 constitute a projection unit that projects light spatially modulated by the optical modulation unit to a projection surface disposed on the windshield 1 of the automobile.

The system control unit 47 controls the light source control unit 40A of the light source unit 40, the drive unit 45, and the liquid crystal display device 61 incorporated in the meter cluster of the dashboard 3 illustrated in FIG. 1.

Figure 3:
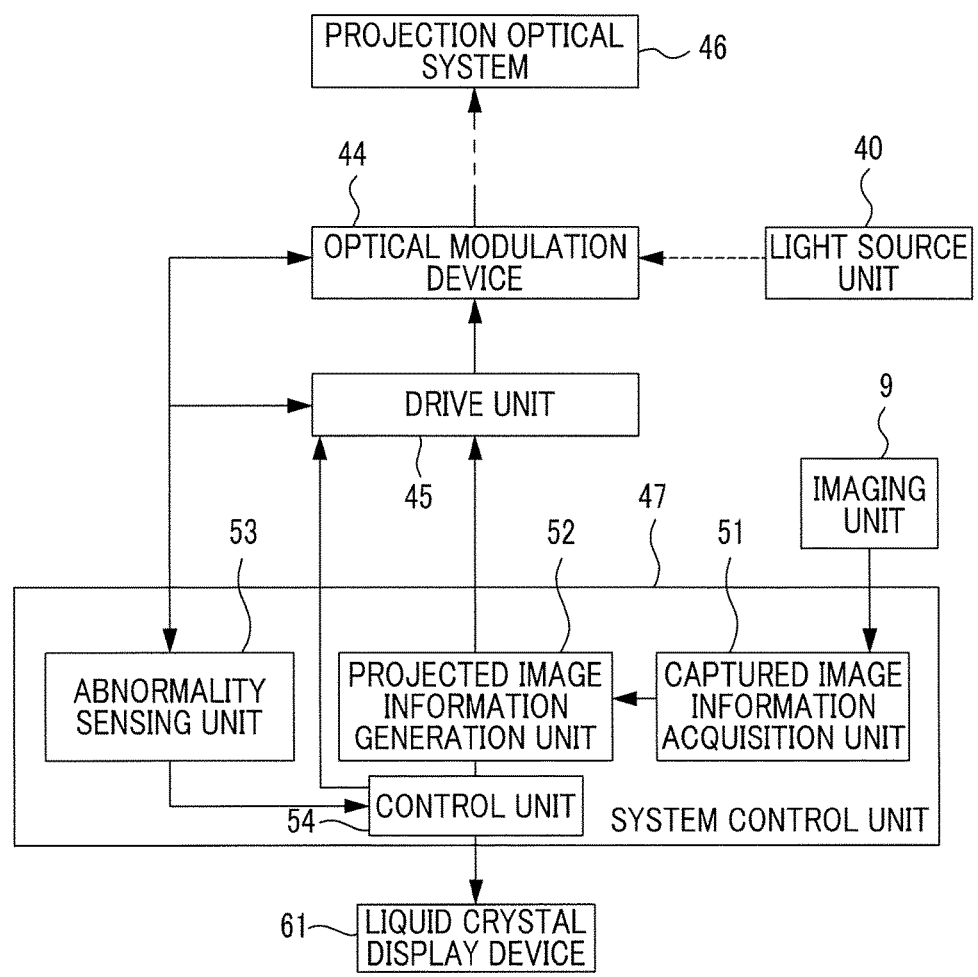
FIG. 3 is a diagram illustrating functional blocks of a system control unit 47 of a light source section 4 illustrated in FIG. 2.

FIG. 3 is a diagram illustrating functional blocks of the system control unit 47 of the light source section 4 illustrated in FIG. 2.

The system control unit 47 of the light source section 4 includes a captured image information acquisition unit 51, a projected image information generation unit 52, an abnormality sensing unit 53, and a control unit 54. The system control unit 47 is a computer having a processor as a main part, and each unit thereof is a functional block that is realized by the computer executing a program.

The captured image information acquisition unit 51 acquires, from the imaging unit 9, the captured image information acquired by imaging by the imaging unit 9 and outputs the captured image information to the projected image information generation unit 52.

The projected image information generation unit 52 analyzes, by a known image analysis process, the captured image information acquired from the captured image information acquisition unit 51 and generates the projected image information.

Specifically, the projected image information generation unit 52 senses an obstacle or a dangerous object such as a pedestrian, a power pole, a street tree, or a vehicle accident from the captured image information acquired from the captured image information acquisition unit 51 and, in the case of sensing an obstacle or a dangerous object, generates first projected image information for reporting presence or absence or the position of the sensed obstacle or the dangerous object to the operator. The projected image information generation unit 52 inputs the first projected image information to the drive unit 45.

The first projected image information is image information for calling attention of the operator of the automobile to the field of view in the traveling direction of the automobile (the front of the windshield 1).

The captured image information that is acquired by imaging by the imaging unit 9 corresponds to the scene at the front of the windshield 1. A relationship between an activated pixel (the state of emitting light to the projection optical system 46 by reflection or transmission) of the optical modulation device 44 and a region of the combiner 2 to which the image is projected is predetermined. Thus, if the region of the obstacle or the dangerous object detected from the captured image information is known, the first projected image information to be output to the drive unit 45 can be determined.

The projected image information generation unit 52 generates second projected image information that indicates guide information for the traveling speed of the automobile and navigation to the destination, and inputs the second projected image information into the drive unit 45. The projected image information generation unit 52 functions as an image information generation unit and an image information input unit.

The abnormality sensing unit 53 constantly monitors whether or not each of the optical modulation unit, which is configured of the optical modulation device 44 and the drive unit 45, and the projected image information generation unit 52 normally operates, and, in the case of presence of abnormality, senses the abnormality.

Abnormality in the optical modulation unit means the state of the optical modulation device 44 not performing spatial modulation as instructed by the drive unit 45.

For example, the abnormality sensing unit 53 acquires signals indicating the states of each pixel of the optical modulation device 44 from the optical modulation device 44 and acquires the projected image information that is generated by the projected image information generation unit 52 and input into the drive unit 45. The abnormality sensing unit 53 calculates the projected image information from the signals indicating the states of each pixel acquired from the optical modulation device 44, determines absence of abnormality in the optical modulation unit in the case of the degree of match between the calculated projected image information and the projected image information acquired from the projected image information generation unit 52 exceeding a threshold, and determines presence of abnormality in the optical modulation unit in the case of the degree of match being less than or equal to the threshold.

Abnormality in the projected image information generation unit 52 means the state of the projected image information input from the projected image information generation unit 52 into the drive unit 45 having a content that does not exist in a normal operation state.

For example, the abnormality sensing unit 53 acquires the projected image information input from the projected image information generation unit 52 into the drive unit 45 and, in the case of all of the values of each pixel constituting the acquired projected image information being greater than or equal to a threshold, determines presence of abnormality in the projected image information generation unit 52. In the case of all of the values of each pixel constituting the projected image information being greater than or equal to the threshold, the image that is based on the light spatially modulated in accordance with the projected image information is a monochromic image that is displayed on the entire surface of the combiner 2. Since any obstacle does not bring this state, sensing this state can sense abnormality in the projected image information generation unit 52.

An imaging unit that images the entirety of the combiner 2 is disposed in the automobile (for example, above the operating seat). The abnormality sensing unit 53 may compare the projected image information calculated from the signals indicating the states of each pixel of the optical modulation device 44 or the projected image information input into the drive unit 45 with captured image information that is acquired by imaging of the combiner 2 by the imaging unit, and, in the case of the degree of match between the projected image information and the captured image information exceeding a threshold, may sense absence of abnormality in at least one of the optical modulation unit or the projected image information generation unit 52 and, in the case of the degree of match therebetween being less than or equal to the threshold, may sense presence of abnormality in at least one of the optical modulation unit or the projected image information generation unit 52.

The control unit 54, in the case of the abnormality sensing unit 53 sensing abnormality in at least one of the optical modulation unit or the projected image information generation unit 52, stops at least one of the optical modulation unit or the light source unit 40. Furthermore, the control unit 54, in the case of the projected image information generated by the projected image information generation unit 52 including the first projected image information which is image information calling attention of the operator of the automobile to the field of view in the traveling direction of the automobile, produces an output for calling attention of the operator to the front field of view.

Next, operation of the HUD having the above configuration will be described.

Figure 4:
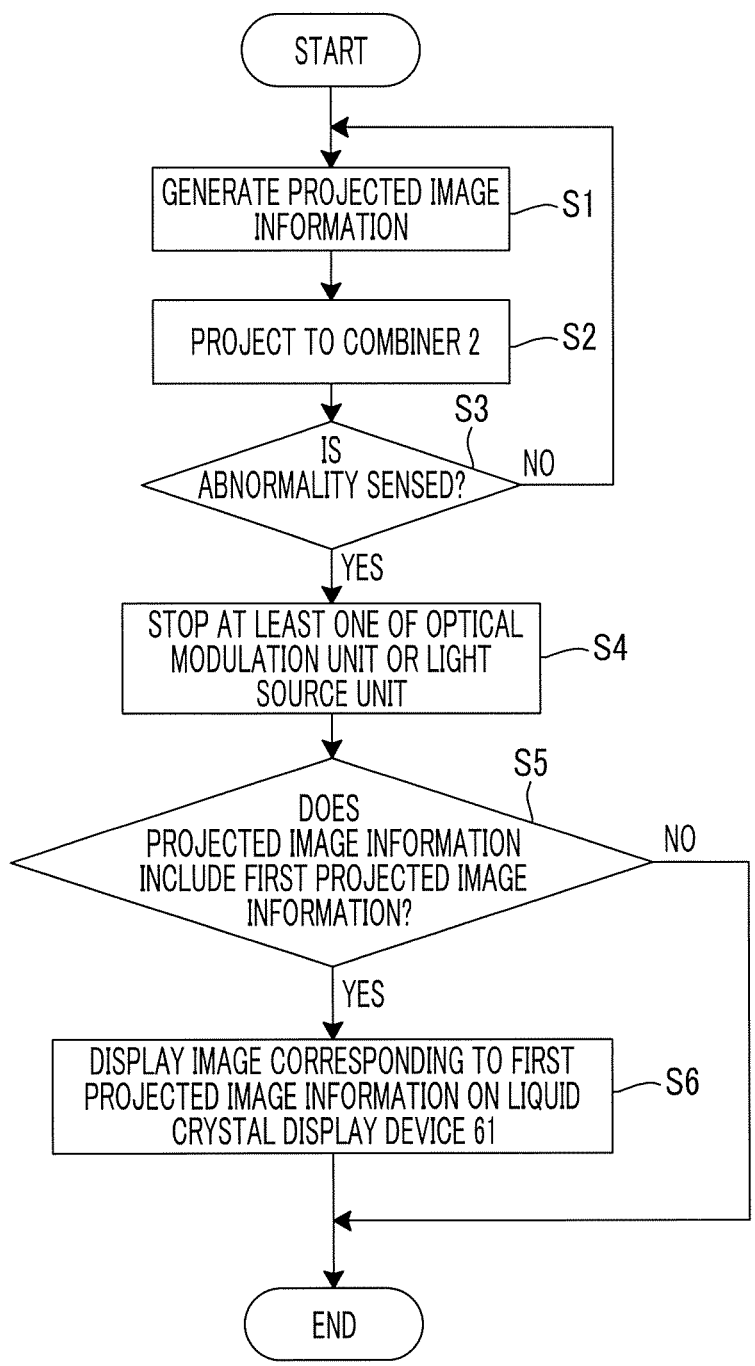
FIG. 4 is a flowchart for describing operation of the HUD illustrated in FIG. 1.

FIG. 4 is a flowchart for describing operation of the HUD illustrated in FIG. 1.

If power is supplied to the HUD, the projected image information generation unit 52 generates the projected image information (Step S1), and light that is spatially modulated in accordance with the projected image information is projected to the combiner 2 (Step S2).

If abnormality occurs in at least one of the optical modulation unit or the projected image information generation unit 52 during operation of the automobile, the abnormality sensing unit 53 senses the abnormality (Step S3: YES).

The system control unit 47, if the abnormality sensing unit 53 senses the abnormality, controls at least one of the optical modulation device 44, the drive unit 45, and the light source unit 40 to stop operation thereof (Step S4).

For example, the control unit 54 instructs the drive unit 45 to place all of the pixels of the optical modulation device into, for example, a non-transmission state so that light from the light source unit 40 does not reach the combiner 2. Alternatively, the control unit 54 instructs the light source control unit 40A of the light source unit 40 to stop the R light source 41r, the G light source 41g, and the B light source 41b to bring the state of light from the light source unit 40 not being incident on the optical modulation device 44. Accordingly, light is not projected to the combiner 2.

Next, the control unit 54 acquires the projected image information generated by the projected image information generation unit 52 and determines whether or not the acquired projected image information includes the first projected image information (Step S5).

In the case of a YES determination in Step S5, the control unit 54 outputs image information corresponding to the first projected image information to the liquid crystal display device 61. If the image information corresponding to the first projected image information is input into the liquid crystal display device 61, the liquid crystal display device 61 displays an alert image that is based on the image information (Step S6).

Figure 5:
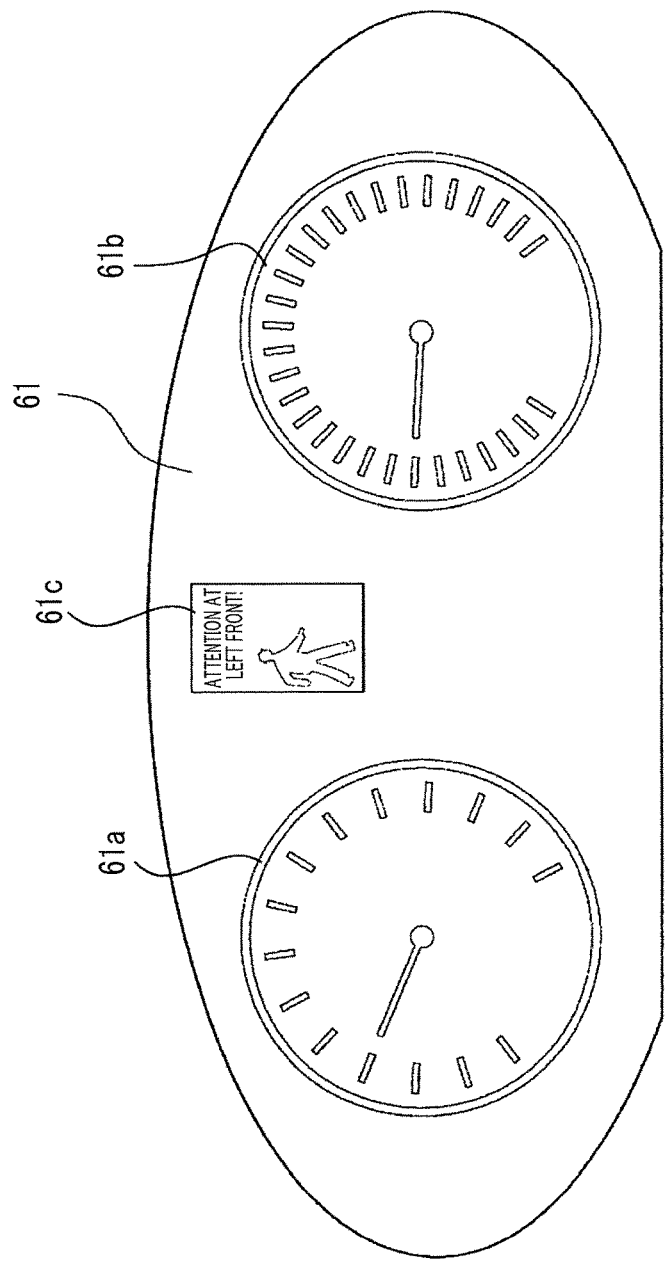
FIG. 5 is a diagram illustrating one example of an image that is displayed on a liquid crystal display device 61 in Step S6 of FIG. 4.

FIG. 5 illustrates one example of the image that is displayed on the liquid crystal display device 61 in Step S6 of FIG. 4. An image, other than the alert image, that includes a speedometer 61b and a tachometer 61a is constantly displayed on the liquid crystal display device 61.

The alert image corresponding to the first projected image information that is displayed on the liquid crystal display device 61 is an icon and a message that call attention of the operator. For example, in the case of the first projected image information being information for reporting existence of a pedestrian, an alert image 61c that includes an icon indicating the pedestrian and a message prompting paying attention to the pedestrian is displayed on the liquid crystal display device 61.

As described thus far, even if images are not displayed on the combiner 2 due to abnormality in at least one of the optical modulation unit or the projected image information generation unit 52, the HUD in FIG. 1 can display, to the operator through the liquid crystal display device 61, the alert image that calls attention of the operator to the front field of view. Thus, the operator can recognize the situation in the front field of view during a period from the stoppage of at least one of the optical modulation unit or the light source unit 40 until actual removal of the image displayed on the combiner 2 and can enjoy an operation assistance function of the HUD.

It is preferable that a display position of the alert image corresponding to the first projected image information on the liquid crystal display device 61 correspond to a projection position of light corresponding to the first projected image information on the combiner 2.

Figure 6:
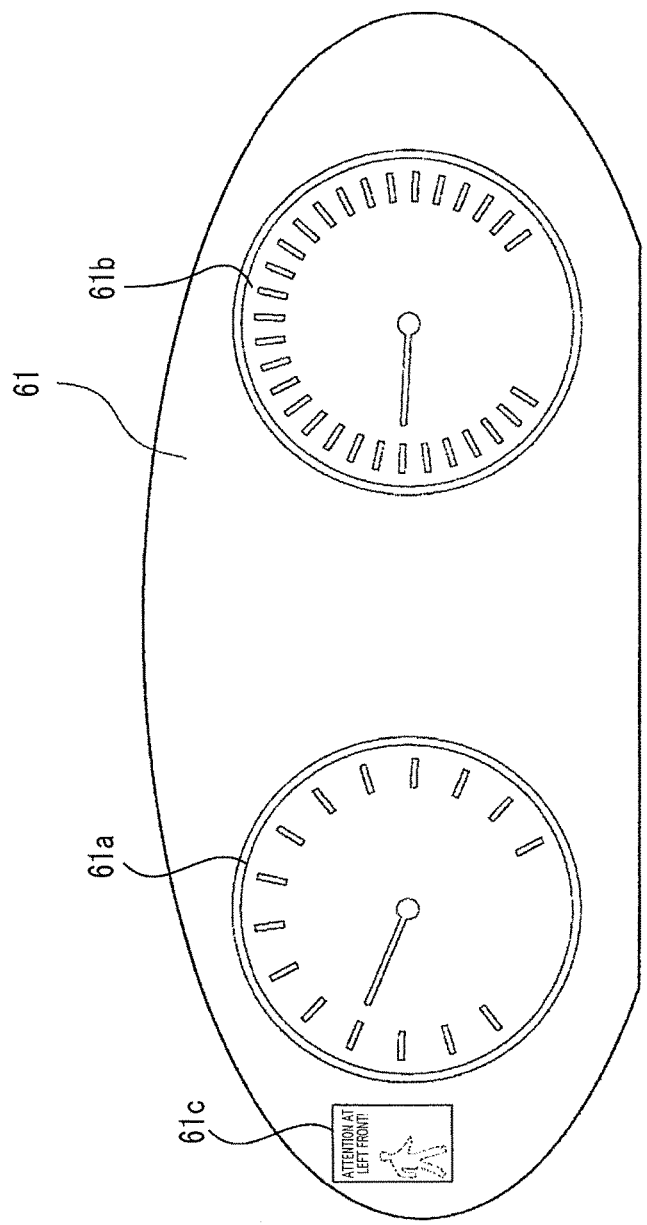
FIG. 6 is a diagram illustrating one example of the image that is displayed on the liquid crystal display device 61 in Step S6 of FIG. 4.

For example, in the case of existence of a pedestrian on the left front side of the windshield 1 and generation of information for reporting the existence of the pedestrian as the first projected image information, the position to which light corresponding to the first projected image information is projected is on the left side of the center of the combiner 2. Therefore, as illustrated in FIG. 6, the alert image 61c is displayed in any position on the left side of the center of the liquid crystal display device 61. If the position to which light corresponding to the first projected image information is projected is on the right side of the center of the combiner 2, the alert image 61c is displayed in any position on the right side of the center of the liquid crystal display device 61. Accordingly, the operator can quickly recognize the actual position of the pedestrian and can promptly perform an operation to avoid the pedestrian.

Figure 7:
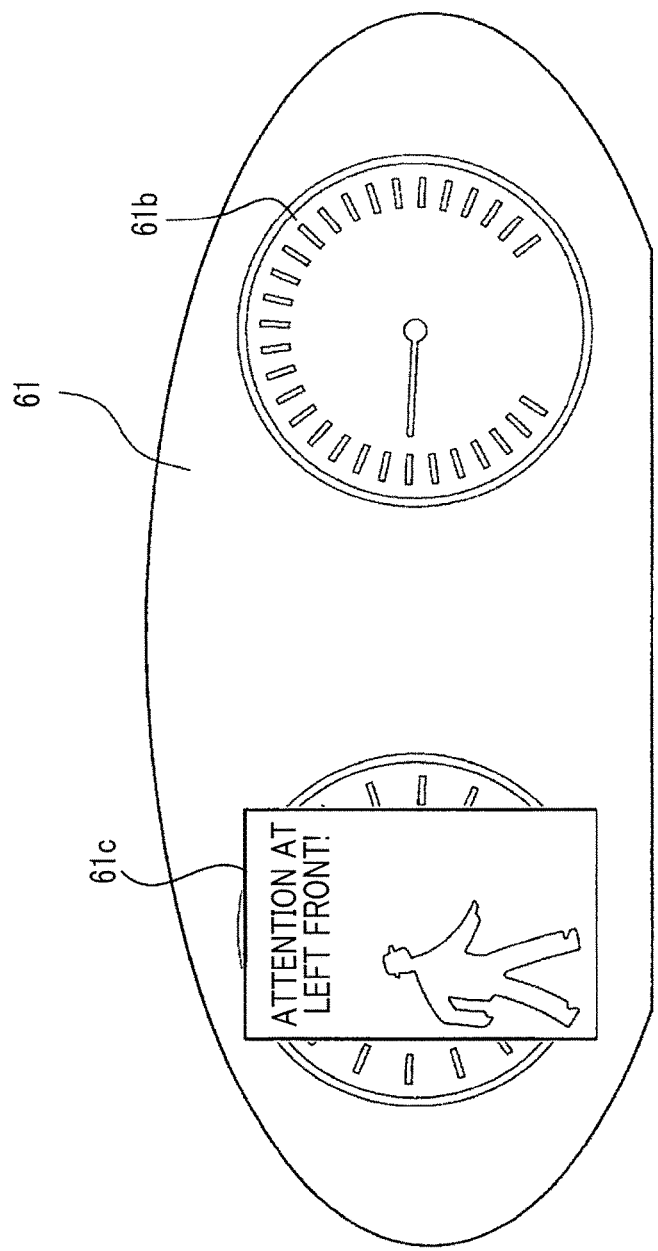
FIG. 7 is a diagram illustrating one example of the image that is displayed on the liquid crystal display device 61 in Step S6 of FIG. 4.

The alert image 61c is displayed in a position not overlapping with other images of instruments in the display examples illustrated in FIG. 5 and FIG. 6. As a modification example, as illustrated in FIG. 7, a part of the image displayed on the liquid crystal display device 61 (an image of an instrument, of instruments such as a speedometer, a tachometer, a fuel gauge, and a water temperature gauge, that does not affect operation even if not being displayed temporarily (for example, a fuel gauge or a tachometer)) may be replaced with the alert image 61c and displayed.

While the alert image corresponding to the first projected image information is displayed on the liquid crystal display device 61 for displaying information of various instruments, the present invention is not limited thereto.

Figure 8:
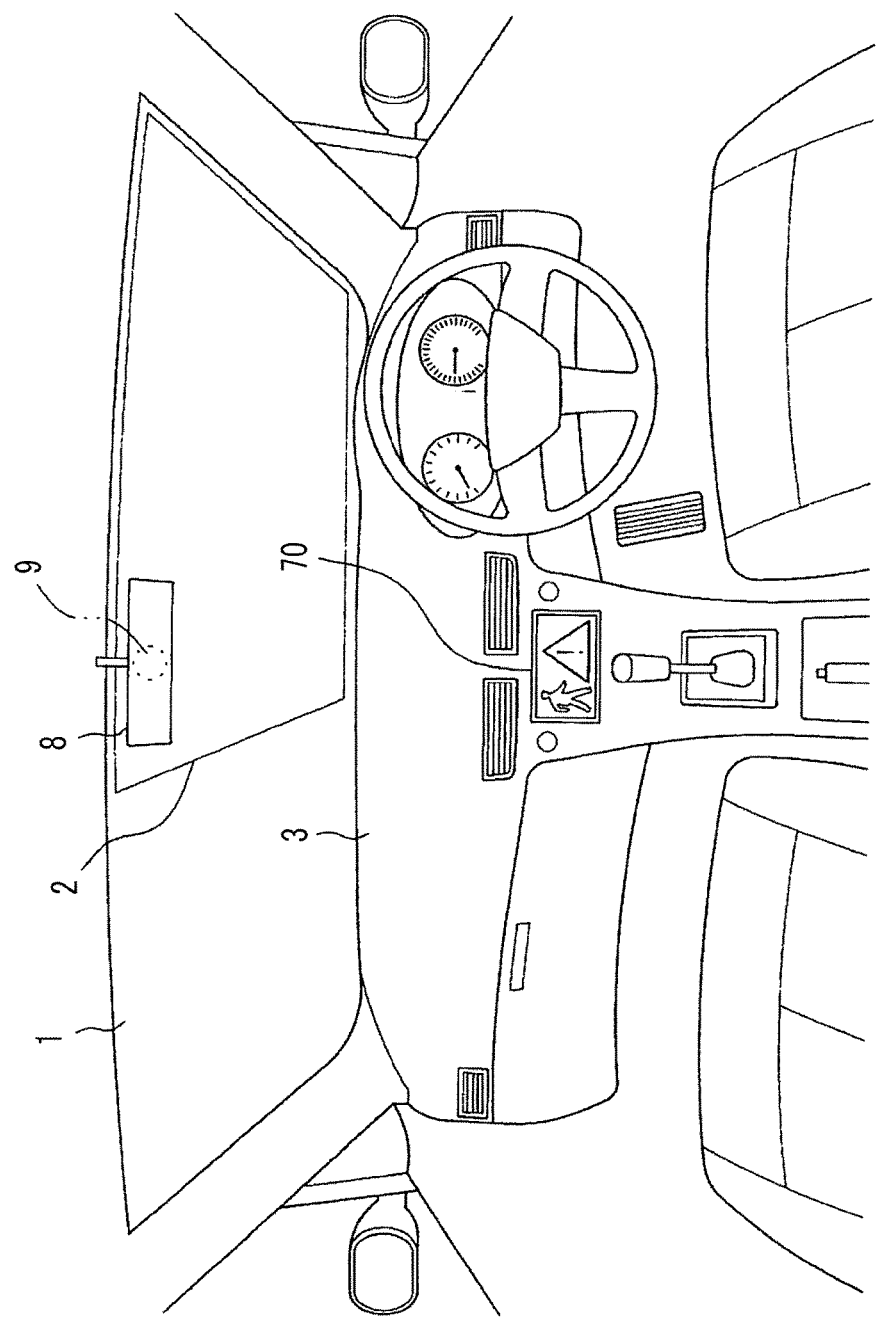
FIG. 8 is a conceptual diagram illustrating another configuration example of the HUD that is one embodiment of the projection type display device of the present invention.

For example, as illustrated in FIG. 8, in the case of a display device 70 for a car navigation device being attached to the dashboard 3, a center console, or the like, the alert image corresponding to the first projected image information may be displayed on the display device 70.

In the case of disposition of two of the HUDs illustrated in FIG. 1 in the automobile and occurrence of abnormality in at least one of the optical modulation unit or the projected image information generation unit 52 in one HUD, the front field of view may be secured by not displaying the image displayed on the combiner 2 of the one HUD, and the alert image corresponding to the first projected image information may be displayed on the combiner 2 of the other HUD. In this case, the sight line moves less than in the case of displaying image information on the liquid crystal display device 61 in the meter cluster or the display device 70. Thus, the operation to avoid the obstacle or the dangerous object can be further promptly performed.

A dedicated display device for displaying the alert image corresponding to the first projected image information may be disposed in the automobile, and the control unit 54 may display the alert image on this display device. According to the configuration of displaying the alert image on the liquid crystal display device 61 at the front of the operating handle, it is possible to call attention of the operator without causing the sight line of the operator to move.

While attention of the operator is called by displaying the alert image, attention may be called by audio output. For example, the control unit 54 outputs, through a speaker of a car radio or a car stereo, audio information that calls attention of the operator in accordance with the first projected image information. Display of the alert image 61c on the liquid crystal display device 61 is effective along with output of the audio information.

The control unit 54 may display, on the liquid crystal display device 61, an image for notifying abnormality sensed by the abnormality sensing unit 53 (for example, an icon indicating a failure of the optical modulation device 44). In doing so, the operator can immediately recognize a failure of the HUD and can promptly deal with the failure by repairing or the like. In addition, the operator can recognize the reason why images are not displayed on the combiner 2 by the HUD, and can focus on operation.

As described thus far, the following matters are disclosed in the present specification.

A projection type display device disclosed includes an image information generation unit that generates image information, an optical modulation unit that spatially modulates light emitted from a light source unit in accordance with the image information, an image information input unit that inputs the image information into the optical modulation unit, a projection unit that projects the light spatially modulated by the optical modulation unit to a projection surface disposed on a windshield of a vehicle, an abnormality sensing unit that senses abnormality in at least one of the optical modulation unit or the image information input unit, and a control unit that, in the case of the abnormality sensing unit sensing abnormality in at least one of the optical modulation unit or the image information input unit, stops at least one of the optical modulation unit or the light source unit and, furthermore, in the case of the image information generated by the image information generation unit including image information that calls attention of an operator of the vehicle to the field of view in the traveling direction of the vehicle, produces an output for calling attention of the operator to the field of view.

In the projection type display device disclosed, the control unit displays, on a display device mounted in the vehicle, an image that corresponds to the image information calling attention.

In the projection type display device disclosed, the control unit displays, on the display device, the image corresponding to the image information calling attention in a position that corresponds to a projection position, on the projection surface, of light corresponding to the image information calling attention.

In the projection type display device disclosed, the control unit displays, on the display device, an icon calling attention and a message calling attention as the image corresponding to the image information calling attention.

In the projection type display device disclosed, the display device further displays an image other than the image corresponding to the image information calling attention, and the control unit replaces a part of the image, other than the image corresponding to the image information calling attention, displayed on the display device with the image corresponding to the image information calling attention.

In the projection type display device disclosed, the display device is a projection type display device that has the image information generation unit, the optical modulation unit, the image information input unit, the projection unit, the abnormality sensing unit, and the control unit.

In the projection type display device disclosed, the control unit further displays an image for notifying abnormality sensed by the abnormality sensing unit on the display device.

In the projection type display device disclosed, the control unit outputs audio for calling attention of the operator to the field of view.

In the projection type display device disclosed, the vehicle includes an automobile.

An operation assistance method disclosed is an operation assistance method using a projection type display device mounted in a vehicle. The projection type display device includes an image information generation unit that generates image information, an optical modulation unit that spatially modulates light emitted from a light source unit in accordance with the image information, an image information input unit that inputs the image information into the optical modulation unit, a projection unit that projects the light spatially modulated by the optical modulation unit to a projection surface disposed on a windshield of the vehicle. The operation assistance method includes an abnormality sensing step of sensing abnormality in at least one of the optical modulation unit or the image information input unit, and a control step of, in the case of sensing abnormality in at least one of the optical modulation unit or the image information input unit in the abnormality sensing step, stopping at least one of the optical modulation unit or the light source unit and, furthermore, in the case of the image information generated by the image information generation unit including image information that calls attention of an operator of the vehicle to the field of view in the traveling direction of the vehicle, producing an output for calling attention of the operator to the field of view.

In the operation assistance method disclosed, in the control step, an image that corresponds to the image information calling attention is displayed on a display device mounted in the vehicle.

In the operation assistance method disclosed, in the control step, the image corresponding to the image information calling attention is displayed on the display device in a position that corresponds to a projection position, on the projection surface, of light corresponding to the image information calling attention.

In the operation assistance method disclosed, in the control step, an icon calling attention and a message calling attention are displayed on the display device as the image corresponding to the image information calling attention.

In the operation assistance method disclosed, the display device further displays an image other than the image corresponding to the image information calling attention, and in the control step, a part of the image, other than the image corresponding to the image information calling attention, displayed on the display device is replaced with the image corresponding to the image information calling attention.

In the operation assistance method disclosed, the display device is a projection type display device that has the image information generation unit, the optical modulation unit, the image information input unit, and the projection unit.

In the operation assistance method disclosed, in the control step, an image for notifying the abnormality sensed in the abnormality sensing step is further displayed on the display device.

In the operation assistance method disclosed, in the control step, audio for calling attention of the operator to the field of view is output.

In the operation assistance method disclosed, the vehicle includes an automobile.

The present invention achieves high convenience and effectiveness by being applied to an automobile HUD particularly for an automobile including an operation assistance function.

EXPLANATION OF REFERENCES

1: windshield
2: combiner
3: dashboard
4: light source section
9: imaging unit
40: light source unit
44: optical modulation device
45: drive unit
46: projection optical system
47: system control unit
52: projected image information generation unit
53: abnormality sensing unit
54: control unit
61: liquid crystal display device
70: display device

What is claimed is:
1. A projection type display device comprising:
 a first optical modulation unit that spatially modulates light emitted from a first light source unit in accordance with image information;
 a first transmitter that inputs the image information into the first optical modulation unit;
 a first projection unit that projects the light spatially modulated by the first optical modulation unit to a projection surface disposed on a windshield of a vehicle;
 a first processor configured to perform as:
  a first image information generation unit that generates the image information; and
  a first abnormality sensing unit that senses abnormality in the first optical modulation unit, wherein the abnormality in the first optical modulation unit is determined when a degree of match between a calculated projected image information of the first optical modulation unit and the imaqe information generated from the first image information generation unit is less than or equal to a threshold; and a first control unit that
stops at least one of the first optical modulation unit or the first light source unit when the first abnormality sensing unit senses abnormality in the first optical modulation unit,
determines whether or not the image information generated by the first image information generation unit includes image information which calls attention of an operator of the vehicle to a field of view in a travelling direction of the vehicle, wherein the image information which calls attention of the operator of the vehicle to the field of view in the travelling direction of the vehicle is generated due to at least one of an obstacle and a dangerous object in the travelling direction of the vehicle,
produces a first output for calling attention of the operator to the field of view when the image information includes the image information calling attention, and
produces no first output for calling attention of the operator to the field of view when the image information does not include the image information calling attention,
wherein the first control unit displays, on a display device mounted in the vehicle, an icon calling attention and a message calling attention as part of the first output for calling attention,
wherein the display device is a projection type display device comprising: a second optical modulation unit that spatially modulates light emitted from a second light source unit in accordance with image information; a second transmitter that inputs the image information into the second optical modulation unit; a second projection unit that projects the light spatially modulated by the second optical modulation unit to the projection surface disposed on the windshield of the vehicle; a second processor configured to perform as: a second image information generation unit that generates the image information; and a second abnormality sensing unit that senses abnormality in at least one of the second optical modulation unit or the second transmitter; and a second control unit that stops at least one of the second optical modulation unit or the second light source unit when the second abnormality sensing unit senses abnormality in at least one of the second optical modulation unit or second the transmitter, determines whether or not the image information generated by the second image information generation unit includes image information which calls attention of the operator of the vehicle to the field of view in a travelling direction of the vehicle, produces a second output for calling attention of the operator to the field of view when the image information includes the image information calling attention, and produces no second output for calling attention of the operator to the field of view when the image information does not include the image information calling attention.

2. An operation assistance method that uses a projection type display device mounted in the vehicle according to claim 1,
the projection type display device including the first processor configured to perform as the first image information generation unit that generates image information, the first optical modulation unit that spatially modulates light emitted from the first light source unit in accordance with the image information, the first transmitter that inputs the image information into the first optical modulation unit, and the first projection unit that projects the light spatially modulated by the first optical modulation unit to the projection surface disposed on the windshield of the vehicle, and
the method comprising:
sensing abnormality in at least one of the first optical modulation unit, wherein the abnormality in the first optical modulation unit is determined when the degree of match between the calculated projected image information of the first optical modulation unit and the image information generated from the first image information generation unit is less than or equal to the threshold; and
stopping at least one of the first optical modulation unit or the first light source unit when sensing abnormality in at least one of the first optical modulation unit,
determining whether or not the image information generated by the first image information generation unit includes image information which calls attention of the operator of the vehicle to the field of view in the travelling direction of the vehicle, wherein the image information which calls attention of the operator of the vehicle to the field of view in the travelling direction of the vehicle is generated due to at least one of the obstacle and the dangerous object in the travelling direction of the vehicle,
producing the first output for calling attention of the operator to the field of view when the image information includes the image information calling attention, and
producing no first output for calling attention of the operator to the field of view when the image information does not include the image information calling attention,
wherein the icon calling attention and the message calling attention are displayed, on the display device mounted in the vehicle, as part of the first output for calling attention,
wherein the display device is a projection type display device comprising: the second optical modulation unit that spatially modulates light emitted from the second light source unit in accordance with image information; the second transmitter that inputs the image information into the second optical modulation unit; the second projection unit that projects the light spatially modulated by the second optical modulation unit to the projection surface disposed on the windshield of the vehicle; the second processor configured to perform as: the second image information generation unit that generates the image information; and the second abnormality sensing unit that senses abnormality in at least one of the second optical modulation unit or the second transmitter; and the second control unit that stops at least one of the second optical modulation unit or the second light source unit when the second abnormality sensing unit senses abnormality in at least one of the second optical modulation unit or the second transmitter, determines whether or not the image information generated by the second image information generation unit includes image information which calls attention of the operator of the vehicle to the field of view in the travelling direction of the vehicle, produces the second output for calling attention of the operator to the field of view when the image information includes the image information calling attention, and produces no second output for calling attention of the operator to the field of view when the image information does not include the image information calling attention.

3. The operation assistance method according to claim 2, wherein, the part of the first output for calling attention is displayed on the display device in a position that corresponds to a projection position, on the projection surface, of light corresponding to the image information calling attention.

4. The operation assistance method according to claim 2, wherein the display device further displays an image other than the part of the first output for calling attention, and
a part of the image other than the part of the first output for calling attention, displayed on the display device is replaced with the part of the first output for calling attention.

5. The operation assistance method according to claim 2, wherein an image for notifying the sensed abnormality is further displayed on the display device.

6. The operation assistance method according to claim 2, wherein audio for calling attention of the operator to the field of view is output.

7. The operation assistance method according to claim 2, wherein the vehicle is an automobile.

8. The projection type display device according to claim 1, wherein the first control unit displays, on the display device, the part of the first output for calling attention in a position that corresponds to a projection position, on the projection surface, of light corresponding to the image information calling attention.

9. The projection type display device according to claim 1, wherein the display device further displays an image other than the part of the first output for calling attention, and
the first control unit replaces a part of the image other than the part of the first output for calling attention, displayed on the display device with the part of the first output for calling attention.

10. The projection type display device according to claim 1,
wherein the first control unit further displays an image for notifying the abnormality sensed by the first abnormality sensing unit on the display device.

11. The projection type display device according to claim 1,
wherein the first control unit outputs audio for calling attention of the operator to the field of view.

12. The projection type display device according to claim 1,
wherein the vehicle is an automobile.

* * * * *